(12) United States Patent
Kim et al.

(10) Patent No.: US 10,843,701 B2
(45) Date of Patent: Nov. 24, 2020

(54) VEHICLE HAVING EMERGENCY SIMULATION MODE AND DRIVING METHOD THEREOF

(71) Applicants: Hyundai Motor Company, Seoul (KR); Kia Motors Corporation, Seoul (KR)

(72) Inventors: Taeg Jo Kim, Seoul (KR); Ki Soo Lee, Suwon-si (KR); Jeong Hwan Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 248 days.

(21) Appl. No.: 16/197,142

(22) Filed: Nov. 20, 2018

(65) Prior Publication Data
US 2020/0086883 A1 Mar. 19, 2020

(30) Foreign Application Priority Data
Sep. 17, 2018 (KR) .......................... 10-2018-0111109

(51) Int. Cl.
*B60W 50/00* (2006.01)
*B60W 50/16* (2020.01)
*B60T 8/176* (2006.01)

(52) U.S. Cl.
CPC ......... *B60W 50/0098* (2013.01); *B60T 8/176* (2013.01); *B60W 50/16* (2013.01)

(58) Field of Classification Search
CPC ............. B60W 50/0098; B60W 50/16; B60W 2050/143; B60W 50/14; B60W 50/082; B60T 8/176
See application file for complete search history.

(56) References Cited

U.S. PATENT DOCUMENTS

| 5,921,780 A * | 7/1999 | Myers ...................... G09B 9/05 434/29 |
| 8,412,499 B2 * | 4/2013 | Sizov ....................... G09B 9/05 703/8 |
| 2017/0110021 A1 * | 4/2017 | Skagius ................... G07C 5/06 |

FOREIGN PATENT DOCUMENTS

KR    10-1592728 B1    2/2016

* cited by examiner

*Primary Examiner* — Alan D Hutchinson
(74) *Attorney, Agent, or Firm* — Morgan, Lewis & Bockius LLP

(57) ABSTRACT

A vehicle may have an emergency simulation mode, for pre-experiencing operating logic provided in the case of emergency to be caused while driving in a vehicle which is actually driven, and a driving method thereof. The vehicle having an emergency simulation mode may include an input unit for allowing a driver to input a command for selecting a simulation mode for emergency, a controller connected to the input unit and configured for storing a database for a plurality of emergencies to be caused in the vehicle, establishing operating logic of a simulation mode and a real mode for each emergency, and selecting operating logic for each emergency depending on the command received from input unit or a sensing value sensed by the vehicle, and an operation unit which is operated according to the operating logic selected by the controller.

9 Claims, 3 Drawing Sheets

VEHICLE HAVING EMERGENCY SIMULATION MODE AND DRIVING METHOD THEREOF

CROSS REFERENCE TO RELATED APPLICATION

The present application claims priority to Korean Patent Application No. 10-2018-0111109, filed on Sep. 17, 2018, the entire contents of which is incorporated herein for all purposes by this reference.

BACKGROUND OF THE INVENTION

Field of the Invention

The present invention relates to a vehicle having an emergency simulation mode and a driving method thereof, and more particularly, to a vehicle having an emergency simulation mode, for pre-experiencing operating logic provided in the case of emergency to be caused while driving in a vehicle which is actually driven, and a driving method thereof.

Description of Related Art

A recent vehicle is provided with various types of safety devices and convenience devices for safe driving and driver convenience. Furthermore, various emergencies occur in vehicle driving and logic for smoothly controlling each of components of a vehicle in a response to the emergencies.

For example, when higher brake power than static friction force between a road surface and a tire is applied to the tire during vehicle driving, a slip phenomenon, i.e., a phenomenon in which the tire slips on a road surface occurs. To prevent the phenomenon and to ensure stable brake power, an anti-lock brake system (ABS) is developed and the ABS detects a slip phenomenon and adjusts brake hydraulic pressure based on the detected slip phenomenon to enable a vehicle to stop within the shortest distance. The ABS may include an electronic control unit (ECU) for controlling electrical elements, a plurality of solenoid valves for controlling brake hydraulic pressure transmitted to each hydraulic brake, an accumulator, and a hydraulic control device such as a hydraulic pump.

With regard to a condition in which an ABS is operated, a slip value is determined based on wheel speed detected by a sensor and vehicle speed estimated from the wheel speed and, when the determined slip value reaches a preset slip value, the ABS is operated. Accordingly, the condition in which the ABS is operated is implemented by a preset logic depending on a vehicle state.

When the ABS is operated, noise is generated during an operation of a motor and valve connected to a brake device, a brake pedal vibrates due to kick back of hydraulic pressure, and a driver may feel the noise and the vibration.

When a driver has not experienced an operation of the ABS, if the ABS is operated irrespective of driver intention, there is a problem in that the driver becomes shocked and nervous due to noise and vibration that are generated at this time and, thus, is not capable of sufficiently putting on the brake to be likely to cause an accident.

Conventionally, to experience logic for emergency to be caused during vehicle driving, a similar simulator to a vehicle is prepared and provides emergency to allow the driver to have experience. However, such experience is implemented in a separate simulator and, thus, there is a problem in that most of drivers have less opportunity to have experience.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a vehicle having an emergency simulation mode, for pre-experiencing operating logic provided in the case of emergency to be caused while driving in a vehicle which is actually driven, and a driving method thereof.

According to an exemplary embodiment of the present invention, a vehicle having an emergency simulation mode may include an input unit for allowing a driver to input a command for selecting a simulation mode for emergency, a controller connected to the input unit and configured for storing a database for a plurality of emergencies to be caused in the vehicle, establishing operating logic of a simulation mode and a real mode for each emergency, and selecting operating logic for each emergency depending on the command received from input unit or a sensing value sensed by the vehicle, and an operation unit which is operated according to the operating logic selected by the controller.

The simulation mode may include ABS operating logic.

The controller may be configured to determine a state of the vehicle and determines whether the vehicle needs to enter the simulation mode upon receiving the command for the simulation mode from the input unit.

The operating unit may include at least one of a brake device, a steering device, and a display device.

According to various exemplary embodiments of the present invention, a driving method of a vehicle having an emergency simulation mode may include inputting an operating command of a simulation mode for emergency to an input unit by a driver in the vehicle, selecting operating logic of the vehicle, corresponding to the operating command of the simulation mode, input to the input unit, by the controller, and experiencing a corresponding operation of the vehicle in a response to the emergency by the driver during an operation of the operating unit according to the selected operating logic.

The method may further include, after the inputting, determining a state of the vehicle to determine whether the vehicle needs to enter the simulation mode.

The determining may include determining at least one of a vehicle starting state, a speed state, a gear stage of a transmission, an opening or closing state of a door, and the remaining power of a battery.

The experiencing may include manipulating the operating unit by the driver according to the simulation mode and providing feedback based on the manipulating to the driver.

The operating unit may include at least one of a brake device, a steering device, and a display device.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
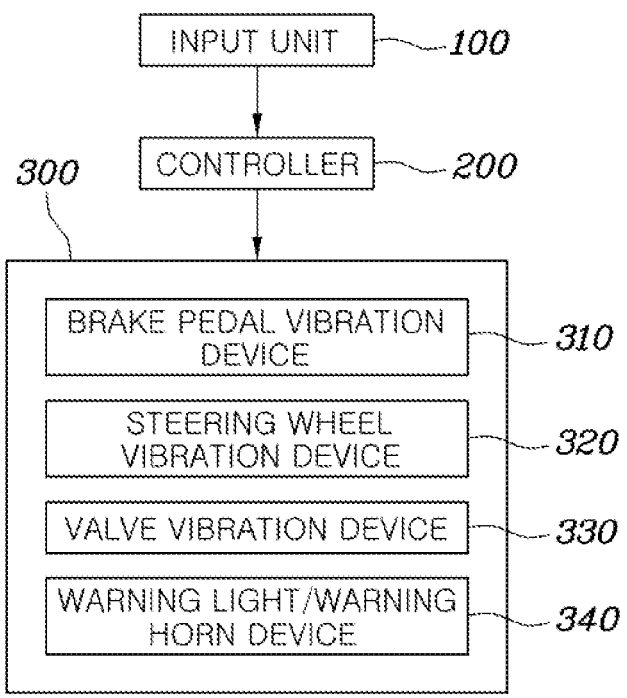
FIG. 1 is a schematic diagram showing a configuration of a vehicle having an emergency simulation mode according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, embodiments of the present invention will be described in detail with reference to the accompanying drawings. The present invention may, however, be embodied in various forms and may not be construed as being limited to the exemplary embodiments set forth herein; rather, these embodiments are provided so that the present disclosure will be thorough and complete, and will fully convey the concept of the present invention to those skilled in the art.

Figure 2:
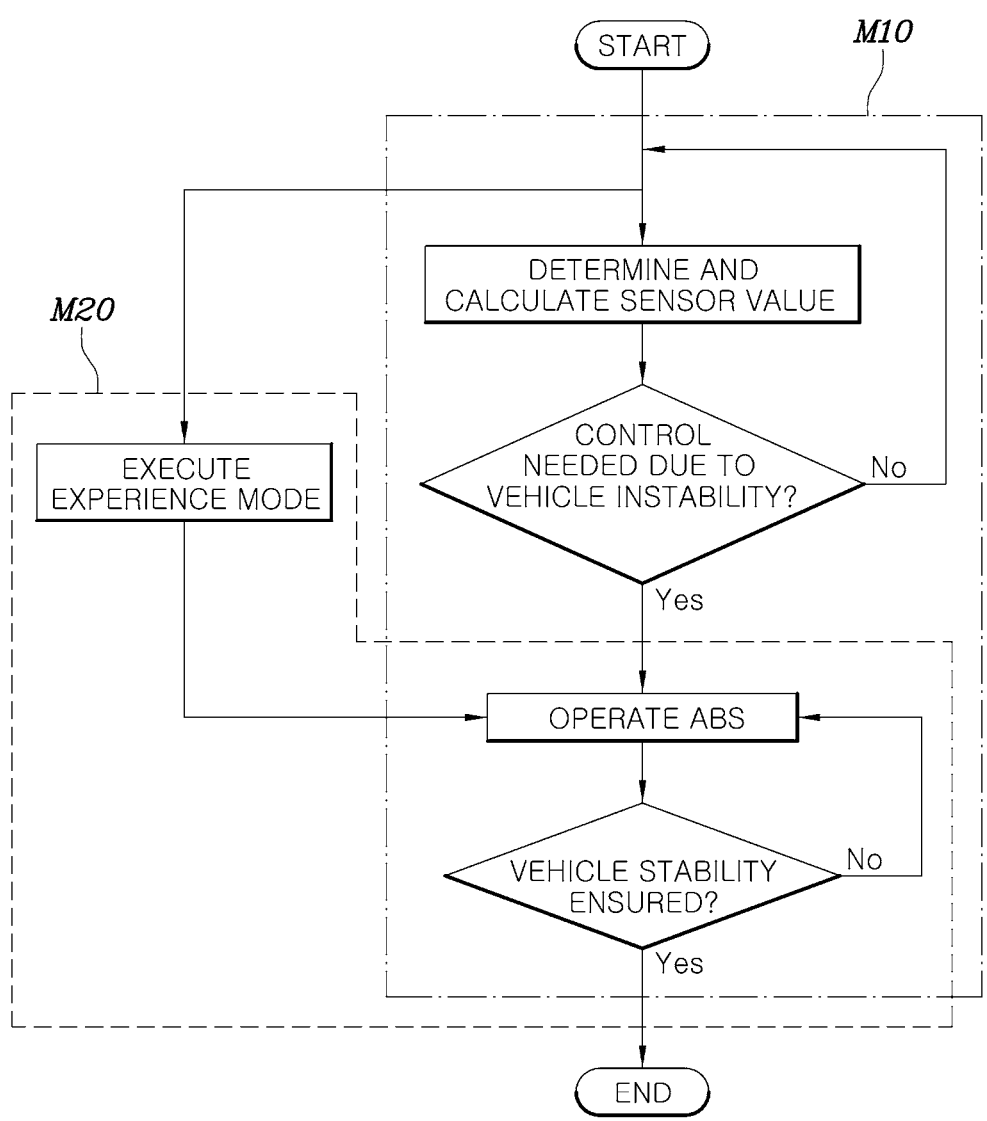
FIG. 2 is a flowchart showing operating logic of a vehicle having an emergency simulation mode according to an exemplary embodiment of the present invention.
Figure 3:
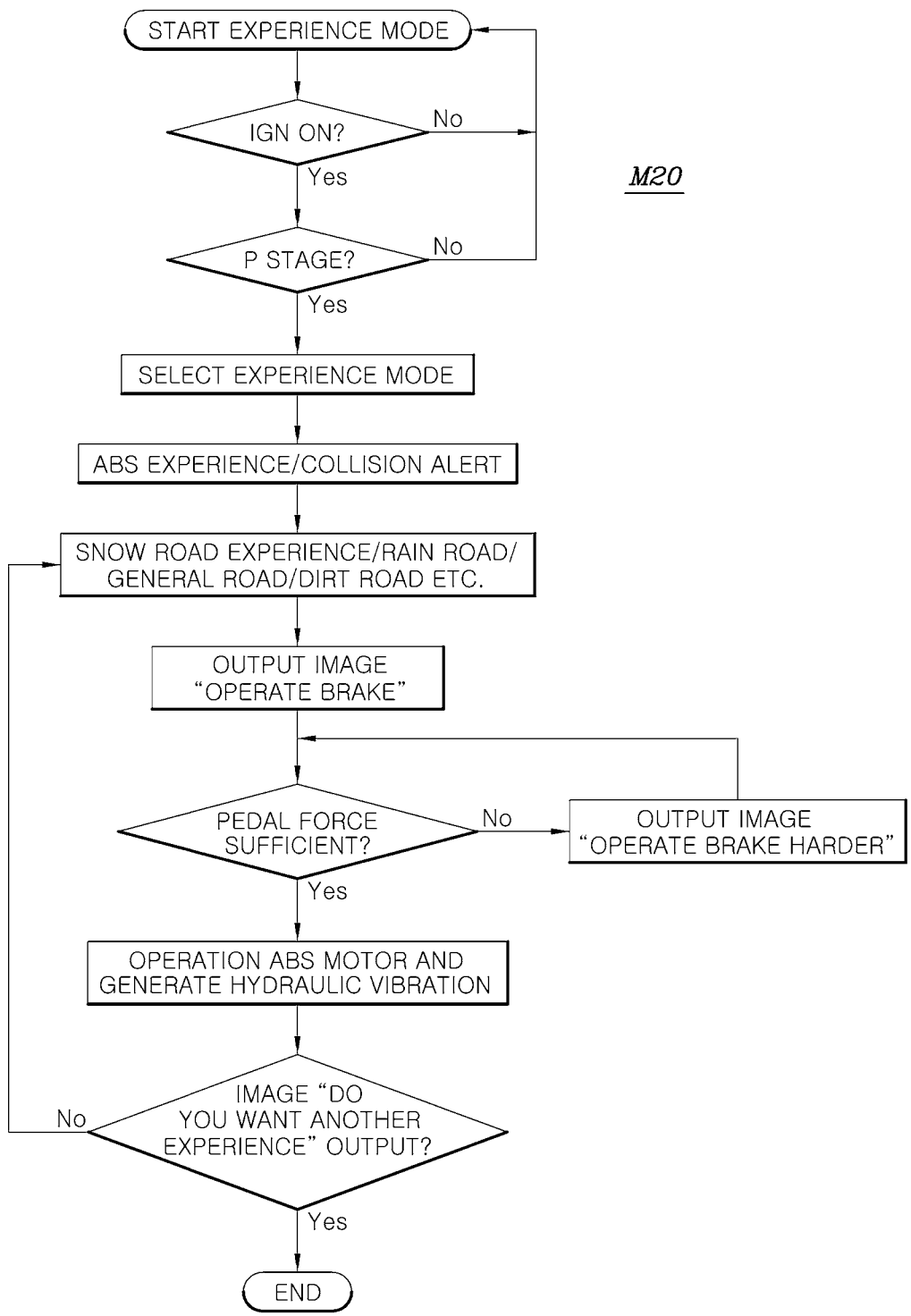
FIG. 3 is a flowchart showing operating logic of a simulation mode according to an exemplary embodiment of the present invention.

FIG. 1 is a schematic diagram showing a configuration of a vehicle having an emergency simulation mode according to an exemplary embodiment of the present invention. FIG. 2 is a flowchart showing operating logic of a vehicle having an emergency simulation mode according to an exemplary embodiment of the present invention. FIG. 3 is a flowchart showing operating logic of a simulation mode according to an exemplary embodiment of the present invention.

As shown in the drawings, a vehicle having an emergency simulation mode according to an exemplary embodiment of the present invention may include an input unit 100 for allowing a driver to input a command for selecting a simulation mode for emergency, a controller 200 for storing a database for a plurality of emergencies to be caused in the vehicle, establishing operating logic of a simulation mode M20 and a real mode M10 for each emergency, and selecting operating logic for each emergency depending on the command received from input unit 100 or a sensing value sensed by the vehicle, and an operation unit 300 which is operated according to the operating logic selected by the controller 200.

The input unit 100 is a device which is directly manipulated by a driver to input a command thereto for execution of the simulation mode M20 for emergency and may be embodied as a device such as a touchscreen provided inside the vehicle. In the instant case, the touchscreen may be embodied in various types of user interfaces (UIs). Needless to say, the input unit 100 may be embodied in a button manner within the vehicle or using a separate remote controller without being limited to a touchscreen.

The controller 200 is a device that determines whether a corresponding state is a state in which the vehicle is configured for executing the simulation mode M20 of the vehicle in a response to corresponding emergency and transmits an operating command of the simulation mode M20 to the operation unit 300 of the vehicle upon receiving the command for executing the simulation mode M20 from the input unit 100 and, in this regard, may also already establish the operating logic for the real mode M10 which is executed when emergency occurs in a general vehicle along with the simulation mode M20.

The controller 200 may determine whether a signal about emergency occurrence is a signal generated in the simulation mode M20 according to the driver command or a signal which is actually generated in the real mode M10 according to the sensing value sensed in the vehicle to operate the operation unit 300. For example, upon receiving the command for the simulation mode M20 from the input unit 100, the controller 200 may determine a state of the vehicle and may determine whether the vehicle needs to enter the simulation mode M20.

To the present end, the vehicle may be provided with a detection device for detecting emergency which is actually caused. For example, the detection device may be various types of sensors for detecting a state of each component included in the vehicle and a state of the vehicle.

The operation unit 300 may be a device configured for implementing the operating logic in a response to the emergency, which is transmitted from the controller 200, and may include at least one of a brake device, a steering device, and a display device, which are included in the vehicle. The operation unit 300 may be various types of components included in a general vehicle for safe vehicle driving and driver convenience and may be a component which is additionally configured to execute the simulation mode M20.

For example, the operation unit 300 may include a brake pedal vibration device 310 for generating vibration in a brake pedal, a steering wheel vibration device 320 for generating vibration in the steering wheel, a valve vibration device 330 for generating vibration in various valves included in the vehicle, and a warning light/warning horn device 340 for generating warning light and warning voice. Needless to say, devices using various methods for recognition and experience of the driver may be applied to a manner in which the operation unit 300 is embodied without being limited to the provided devices.

The simulation mode M20 embodied by the input unit 100, the controller 200, and the operation unit 300 may be operating logic for various types of emergencies to be caused in the vehicle. For example, the simulation mode M20 may be operating logic embodied to enable the driver to recognize vehicle emergency, such as anti-lock brake system (ABS) operating logic for preventing a slip phenomenon of the vehicle or operating logic for cluster blinking and seat belt vibration due to collision alert.

A driving method of the above configured vehicle having an emergency simulation mode according to an exemplary embodiment of the present invention is described below with reference to drawings.

The driving method of the vehicle having the emergency simulation mode according to an exemplary embodiment of the present invention may broadly include inputting an operating command of the simulation mode M20 for emergency to the input unit 100 by a driver in the vehicle, selecting operating logic of the vehicle, corresponding to the operating command of the simulation mode M20, input to the input unit 100, by the controller 200, and experiencing a corresponding operation of the vehicle in a response to the emergency by the driver during an operation of the operating unit according to the selected operating logic. The driving method may further include determining a state of the vehicle to determine whether the vehicle needs to enter the simulation mode M20 after the inputting.

According to the exemplary embodiment of the present invention, a simulation mode for ABS operating logic is exemplified.

To execute the simulation mode for the ABS operating logic, the real mode M10 for the ABS operating logic for preventing a slip phenomenon of the vehicle may be established in the vehicle and the simulation mode M20 may be established using the pre-established real mode M10 in the vehicle, as shown in FIG. 2.

In the real mode M10, a sensor value detected by a sensor included in the vehicle may be determined and calculated to determine whether a corresponding situation needs to be controlled due to instability of the vehicle. For example, a slip value may be determined based on wheel speed detected by the sensor included in the vehicle and vehicle speed estimated from the wheel speed and, when the determined slip value reaches a preset slip value, the emergency may be determined to be controlled.

When the emergency is determined to be controlled as such, the ABS operating logic may be operated and a sensor value detected by the sensor may be determined and determined after the operation of the ABS and, thus, whether vehicle stability is ensured. Accordingly, when it is determined that vehicle stability is ensured, the operation of the ABS may be stopped and, when it is not determined that vehicle stability is ensured, the operation of the ABS may be maintained.

The simulation mode M20 may be executed by selection of the driver instead of determination of whether the current state is emergency based on the sensor value detected by the sensor included in the vehicle.

When the simulation mode M20 is executed, the ABS operating logic may be implemented and the operation of the ABS may be stopped or maintained according to a signal indicating whether vehicle stability is ensured, after the operation of the ABS. In the instant case, whether vehicle stability is ensured may be provided in various ways according to the operating logic which is pre-established in the simulation mode M20.

A procedure of executing a simulation mode (experience mode) is described in detail with reference to FIG. 3.

As shown in FIG. 3, when the driver intends to execute the simulation mode, the driver may input a command for execution of the simulation mode M20 using the input unit 100 included in the vehicle, for example, a touchscreen.

As such, the controller 200 may determine whether a vehicle state is configured for entering the simulation mode M20. In the instant case, the vehicle state may include at least one of a vehicle starting state, a speed state, a state of a gear stage of a transmission, an opening or closing state of a door, and the remaining power of a battery. For example, as shown in FIG. 3, whether a vehicle starts on (IGN ON) or a transmissions gear is positioned in a stage P may be detected and determined to determine whether the vehicle enters the simulation mode M20.

When the vehicle enters the simulation mode M20, a simulation signal of confirmation of entrance into the simulation mode M20 and emergency such as collision alert may be indicated through a touchscreen. Conditions caused during vehicle driving may be displayed through the touchscreen.

As such, an indication command 'Operate Brake' may be displayed on the touchscreen.

As such, the driver may press a brake pedal like in the case in which emergency occurs.

In the instant case, when brake pedal force is sufficient to operate the ABS, feedback such as vibration and noise according to the operation of the ABS may be provided to the driver while the operation unit 300 for realizing the operation of the ABS is operated.

In the instant case, the operation unit 300 may include the aforementioned brake pedal vibration device 310, steering wheel vibration device 320, valve vibration device 330, and warning light/warning horn device 340 and, in this regard, the operation unit 300 may be embodied using various motors and hydraulic devices.

When brake pedal force dose not reach a condition for operating the ABS, an indication command 'Operate Brake Harder' may be displayed on the touchscreen.

When the operation unit 300 is operated to terminate the experience of the operation of the ABS, an image for issuing a command for another experience or termination of experience may be displayed on the touchscreen and, in this regard, the driver may selectively transmit a command.

As described above, according to an exemplary embodiment of the present invention, a driver is configured for pre-experiencing and learning the operating logic of the vehicle in a response to emergency to be caused during vehicle driving and, thus, the driver may not be embarrassed and, instead, may stably control the vehicle when emergency occurs.

Even if there is no separate simulator, a control simulation of the vehicle is implemented in a subject vehicle in a response to various emergencies and, thus, the driver may sufficiently exert driving performance of the driver when emergency occurs during vehicle driving.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicle having an emergency simulation mode, the vehicle comprising:
    an input unit configured for receiving a command for selecting the emergency simulation mode;
    a controller connected to the input unit and configured for storing a database for a plurality of emergencies caused in the vehicle, establishing operating logic of an emergency simulation mode and a real mode for each emergency, and selecting operating logic for each emergency depending on the command received from the input unit or a sensing value sensed by the vehicle; and
    an operation unit which is connected to the controller and configured to be operated according to the operating logic selected by the controller.

2. The vehicle having the emergency simulation mode of claim 1,
    wherein the emergency simulation mode includes ABS operating logic.

3. The vehicle having the emergency simulation mode of claim 1,
    wherein the controller is configured to determine a state of the vehicle and to determine whether the vehicle needs to enter the emergency simulation mode upon receiving the command from the input unit.

4. The vehicle having the emergency simulation mode of claim 1,
    wherein the operation unit includes at least one of a brake device, a steering device and a display device.

5. A driving method of a vehicle having an emergency simulation mode, the method comprising:
    receiving, by an input unit, an operating command for the emergency simulation mode;
    selecting, by a controller connected to the input unit, an operating logic of the vehicle, corresponding to the operating command of the emergency simulation mode; and
    operating, by the controller, an operation unit which is connected to the controller according to the operating logic selected by the controller, whereby a driver experiences a corresponding operation of the vehicle in a response to an emergency by the driver during operating the operating unit according to the selected operating logic.

6. The method of claim 5, further including:
    after the receiving, determining, by the controller, a state of the vehicle to determine when the vehicle needs to enter the emergency simulation mode.

7. The method of claim 6, wherein the determining a state of the vehicle includes determining at least one of a vehicle starting state, a speed state, a gear stage of a transmission, an operating and closing state of a vehicle door, and a remaining power of a battery.

8. The method of claim 5, further including:
    providing, by the controller, feedback based on manipulation of the operating unit caused by the driver according to the emergency simulation mode, to the driver.

9. The method of claim 8, wherein the operating unit includes at least one of a brake device, a steering device and a display device.

* * * * *